United States Patent [19]

Evoy et al.

[11] Patent Number: 5,951,689
[45] Date of Patent: Sep. 14, 1999

[54] MICROPROCESSOR POWER CONTROL SYSTEM

[75] Inventors: David R. Evoy, Tempe; Desi Rhoden, Phoenix, both of Ariz.

[73] Assignee: VLSI Technology, Inc., San Jose, Calif.

[21] Appl. No.: 08/775,629

[22] Filed: Dec. 31, 1996

[51] Int. Cl.$^6$ .................................................. G06F 13/00
[52] U.S. Cl. .................. 713/322; 713/300; 713/320; 712/23
[58] Field of Search .............................. 395/750.04, 550, 395/800.23; 364/571.03, 748.01, 707, 200; 711/3

[56] References Cited

U.S. PATENT DOCUMENTS

| | | |
|---|---|---|
| 4,234,920 | 11/1980 | Van Ness et al. ....................... 364/200 |
| 5,133,077 | 7/1992 | Karne et al. ............................. 395/800 |
| 5,420,808 | 5/1995 | Alexander et al. ....................... 364/707 |
| 5,452,434 | 9/1995 | MacDonald ............................... 395/550 |
| 5,583,805 | 12/1996 | Elliott et al. ............................. 364/748 |
| 5,590,061 | 12/1996 | Hollowell, II et al. ............... 364/71.03 |
| 5,630,143 | 5/1997 | Maher et al. ............................ 395/750 |
| 5,655,124 | 8/1997 | Lin ...................................... 395/750.04 |
| 5,666,537 | 9/1997 | Debnath et al. ................... 395/750.04 |
| 5,813,022 | 9/1998 | Ramsey et al. .............................. 711/3 |

*Primary Examiner*—Ayaz R. Sheikh
*Assistant Examiner*—Eric S. Thlang
*Attorney, Agent, or Firm*—LaValle D. Ptak

[57] ABSTRACT

A power control system for a microprocessor, having multiple parallel operated execution units, functions to disable some of the execution units to conserve power and/or reduce heat. The execution units are disabled by preventing the application of clock pulses to these execution units. This operation is effected by a power control unit which enables and disables gates coupled between a source of clock signals and the execution units.

9 Claims, 1 Drawing Sheet

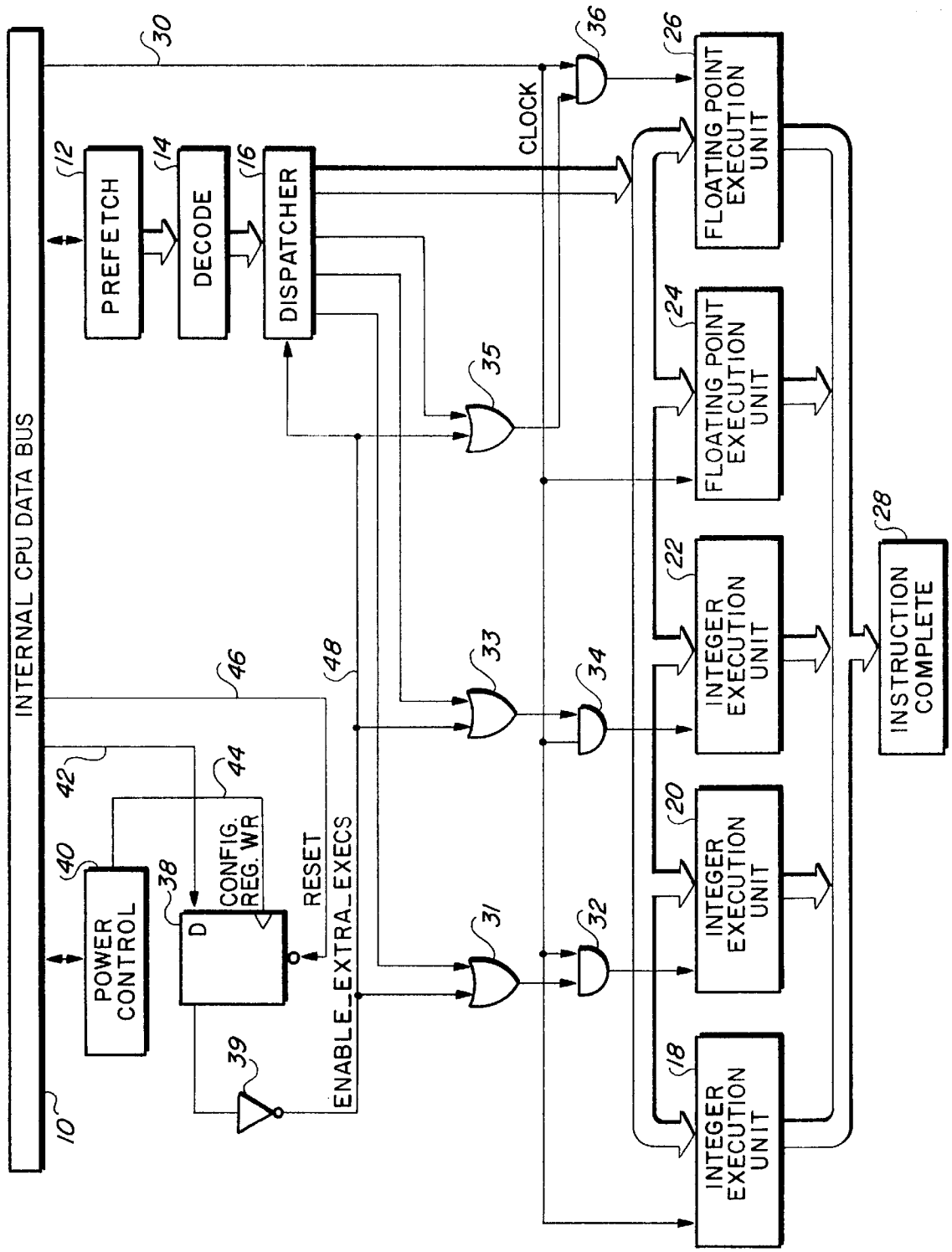

MICROPROCESSOR POWER CONTROL SYSTEM

BACKGROUND

In the development of personal computers, there is a continuing escalation of the demands created by ever more sophisticated software to improve the performance or operating characteristics of the computer. Modern personal computers primarily use microprocessors developed by Intel® designated as the Pentium® microprocessor. With this and other microprocessors, the key to high performance in a personal computer is the utilization of parallelism in the processing of instructions.

To accomplish parallel operation, multiple execution units are operated in parallel under the control of a dispatcher to permit simultaneous processing of instructions. While the use of multiple parallel-operated execution units increases the performance of the computer, this is accomplished by the consumption of increased power, which also generates increased temperatures in the computer. Even though multiple parallel execution units increase the performance of the processor, power is wasted when conflicts exist and the results must be discarded. In addition, power is wasted when some of the execution units are idle or performing no operations during various time intervals.

Except for the thermal considerations, power consumption in a desktop computer generally is not a factor. The use of increased power levels, however, is a significant factor for most portable battery operated personal computers. The increased performance which is obtained from the operation of parallel execution units is offset by decreased battery life. In the case of portable personal computers, the thermal considerations also can be significant because of the compact packaging and less efficient cooling systems.

Portable computers generally are equipped with thermal sensors, which operate cooling fan controls and clock throttling in order to avoid overheating and destruction of sensitive components. Generally, however, portable computers involve a trade-off between performance and battery life. If long battery life is desired, slower performance or lower performance levels are employed. If high performance (that is, parallel operation of multiple execution units) is employed, the result generally is a shortened battery life between recharging.

It is desirable to provide a power control system for a microprocessor which selectively may be used to conserve battery life or to increase performance.

SUMMARY OF THE INVENTION

In a microprocessor system utilizing multiple execution units capable of operation in parallel for maximum performance, provisions are made to effect a trade-off between performance and power consumption. To reduce power consumption, some of the parallel-connected execution units are disabled in response to a control signal applied whenever power reduction is desired. Others of the execution units are not disabled; so that operation of the microprocessor at reduced performance continues.

BRIEF DESCRIPTION OF THE DRAWING

The sole FIGURE of the drawing is a block diagram of a preferred embodiment of the invention.

DETAILED DESCRIPTION

Reference now should be made to the drawing, which is a schematic block diagram of a portion of a microprocessor illustrating a preferred embodiment of the invention. As shown in the drawing, the microprocessor includes an internal CPU data bus of a conventional configuration for handling the internal data within the microprocessor. In conjunction with the system, there is a power control unit 40, which may incorporate power management hardware and/or software for conventional fan control, clock throttling triggered by inactivity monitors or by thermal sensors detecting excess temperature. In addition, the power control unit 40 includes hardware/software for effecting power control according to the present invention. Communication between the internal data bus 10 and the power control unit 40 is indicated by the interconnections between them, as shown in the drawing.

In the typical microprocessor system with which the invention shown in the drawing is used, a pre-fetch circuit 12 communicates with the data bus 10 to supply pre-fetched instructions through a decode block 14 to a dispatcher 16. For maximum performance, the dispatcher 16 is shown as coupled by way of a bus to three parallel integer execution units 18, 20 and 22 and to two parallel floating point execution units 24 and 26. The outputs of all of these execution units 18, 20, 22, 24 and 26 are coupled with an instruction complete block 28.

The system which is illustrated is a typical super scaler processor, in which the multiple execution units 18, 20, 22, 24 and 26 may be operated in parallel to increase the performance of the microprocessor with which they are associated. Multiple instructions are executed at the same time in the different execution units 18, 20, 22, 24 and 26, as long as these instructions do not contend for the same resources (namely, registers or memory, etc., not shown). The power which is used by the instruction completion block 28, which is specific to multiple execution units (like register renaming) and the power used by the logic which performs the checks for dependence, is power which can be saved, if necessary, to reduce heat or to reduce battery power consumption. In a typical super scaler processor, clock signals are supplied to all of the execution units 18, 20, 22, 24 and 26 at all times; so that any power management control effected by a power control block such as the block 40, operates on all of the units in the same manner.

As shown in the drawing, however, clock signals supplied over the internal CPU data bus 10 over the clock lead 30 are supplied directly to only two of the execution units, namely the integer execution unit 18 and the floating point execution unit 24. The clock signals for the other three execution units 20, 22 and 26 are supplied to one input of a respective AND gate 32, 34 and 36, the outputs of which are connected to the execution units 20, 22 and 26 to supply clock signals to those units.

The other input to each of the AND gates 32, 34 and 36 is supplied through corresponding OR gates 31, 33 and 35. Each of these OR gates is a two-input gate having one input from the dispatcher 18 and another input from an execution unit control logic flip-flop 38. The output of the flip-flop 38 is a signal supplied to each of the three OR gates 31, 33 and 35 and to the dispatcher 16 over a lead 48. This output is an enable output for the execution units 20, 22 and 26.

The enable/disable control input is applied over a lead 42 from the data bus 10 and may be any bit on the internal data bus of the CPU or microprocessor. As illustrated in the drawing, the power control unit 40 supplies a clock or configuration write signal over a lead 44 to the clock input of the flip-flop 38 to set the flip-flop 38 to its "enable" or "disable" output whenever the signal on the lead 44 occurs at a time when the corresponding "enable" or "disable" control signal is present on the lead 42 from the data bus 10.

It should be noted that the signals on the leads 42 and 44 from the power control unit 40 may be generated by a software control established whenever the user of the microprocessor system desires to conserve power, thereby placing the system in a "low power" mode of operation. In addition these signals also may be generated automatically in response to a thermistor indicating a temperature which is higher than desired, requiring a reduced power consumption by the system, so long as the high temperature condition persists. As noted previously, the output from such a thermistor sensor also may be used to control a fan operation in the processor.

The decision to operate on reduced power may be effected as noted above, either directly by means of a switch or other hardware implementation (such as the thermistor discussed previously); or the power control may be implemented by means of software. If a high performance operating level of the microprocessor is not required for a particular application, software instructions may be utilized to operate the power control circuit 40 to cause the output applied over the lead 48 to go from a normal "high" to a "low" output. This output is supplied through an inverter 39 over the lead 48 to the dispatcher 16 and to one of the two inputs of three OR gates 31, 33 and 35, the outputs of which are connected, respectively, to one of the two inputs of AND gates 32, 34 and 36.

During the normal high performance mode of operation of the system, the output of the inverter 39 is high; and this output, supplied through the NOR gates 31, 33 and 35 to the AND gates 32, 34 and 36, enables these AND gates to pass clock pulses supplied to them. As a consequence, all of the execution units 18, 20, 22, 24 and 26 are continuously clocked and are operated to process instructions in accordance with the outputs of the dispatcher 16.

When power conservation or power reduction is required, either as a result of low battery or software or hardware implementation by the operator of the system, the signal over the lead 42 (originating from the CPU data bus 10 40), coinciding with the output of the power control unit 40 applied over the lead 44, causes the output of the flip-flop 38 to go high. This causes a low input to be applied from the inverter 39 over the lead 48 to the dispatcher 16 and to the OR gates 31, 33 and 35.

The dispatcher 16 also provides a second input to each of the OR gates 31, 33 and 35. Whenever the signal on the lead 48 goes low, the dispatcher 16 supplies a high input over the respective ones of the leads coupled to the OR gates 31, 33 and 35 only for so long as is necessary to complete the execution of the information currently being handled by the respective execution unit 20, 22 or 26. Upon completion of the execution of that information, the signal on the corresponding input to the OR gate 31, 33 or 35 goes low, thereby removing the enabling signal to the corresponding AND gate 33, 34 and 36. When the second input to the AND gates 32, 34 and 36 is low, no clock signals are passed by these gates; and the execution units 20, 22 and 26 are removed from the system operation.

When the system is in the "low power" mode of operation described above, the execution units 18 and 24 continue to function in a normal manner; but no parallel processing is effected by the system. Consequently, power consumption is reduced; but at the same time, there is a concurrent reduction in the performance level of the system.

At such time high performance once again is desired or required, the signals on the inputs 42 and 44 to the flip-flop 48 are such to cause the output of the flip-flop 38 to go "low". This causes the inverted output from the inverter 39 to go high, thereby enabling the AND gates 32, 34 and 36. Clock pulses then are passed by these AND gates to the execution units 20, 22 and 26, along with the units 18 and 24, which always are interconnected into the system operation.

The operation of the system may be summarized by noting that a decision first is made in the power control unit 40 to decrease power consumption and possibly lower the microprocessor performance. When this decision is made, the flip-flop 38 is triggered to produce a "high" output, which is inverted by the invertor 39 and supplied to the dispatcher 16 and through the OR gates 31, 33 and 35 to the clock control AND gates 32, 34 and 36, respectively. In response to the control bits supplied over the lead 48, the dispatcher 16 operates to no longer dispatch any additional instructions to the execution units which are to be disabled (namely, units 20, 22 and 26 in the example shown in the drawing). The execution units which are to be disabled are permitted to empty, since the AND gates 32, 34 or 36 for such units continue to be enabled by signals supplied from the dispatcher 16 through the OR gates 31, 33 or 35 until all instructions have been processed by the execution units which are to be subsequently disabled. Once the units are disabled, the system operates with the remaining execution units 18 and 26, as described above.

At any subsequent time, when the power control unit 40 determines to increase the performance of the microprocessor and also increase power consumption, signals are applied to the flip-flop 38 to cause the output to go low. This in turn causes a high enabling output to be obtained from the inverter 39 and supplied through the OR gates 31, 33 and 35 to the clock control AND gates 32, 34 and 36, thereby resuming the supply of clock pulses to the execution units 20, 22 and 26. Normal operation of a parallel processing system then is effected by the dispatcher 16, which is enabled to function with all of the execution units 18, 20, 22, 24 and 26 in a conventional manner.

The foregoing description of the preferred embodiment of the invention is to be considered as illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. A power control system for a microprocessor including in combination:

a plurality of integer execution units and a plurality of floating point execution units connected in parallel to operate simultaneously between an input bus and an output bus in said microprocessor;

an instruction dispatcher coupled through said input bus to said execution units for supplying instructions for execution by said execution units, wherein multiple instructions may be executed simultaneously by different ones of said execution units;

a source of clock signals for operating said execution units;

a plurality of normally enabled power control gates coupled between said source of clock signals and less than all of said integer execution units and less than all of said floating point execution units for normally passing clock signals to said execution units when the corresponding ones of said gates are enabled; and a source of gate control signals coupled with said gates for enabling and disabling said gates, whereby whenever said gates are disabled, clock pulses are not passed to said less than all of said execution units which then are not operated, thereby reducing power consumption of said microprocessor.

2. The combination according to claim 1 wherein said power control unit provides said gate control signals in response to a plurality of predetermined conditions.

3. The combination according to claim 2 wherein said plurality of gates are AND gates.

4. The combination according to claim 3 wherein said source of gate control signals comprises a power control unit further coupled with said instruction dispatcher and wherein said instruction dispatcher has control outputs coupled with said gates for maintaining said gates enabled for predetermined time intervals after said power control unit operates to disable said gates.

5. The combination according to claim 4 wherein said gate control signals from said power control unit and said control outputs from said instruction dispatcher are coupled through OR gates to corresponding enabling/disabling inputs of said plurality of gates.

6. The combination according to claim 1 wherein said source of gate control signals comprises a power control unit further coupled with said instruction dispatcher and wherein said instruction dispatcher has control outputs coupled with said gates for maintaining said gates enabled for predetermined time intervals after said power control unit operates to disable said gates.

7. The combination according to claim 6 wherein said gate control signals from said power control unit and said control outputs from said instruction dispatcher are coupled through OR gates to corresponding enabling/disabling inputs of said plurality of gates.

8. The combination according to claim 1 wherein said power control unit provides said gate control signals in response to a plurality of predetermined conditions.

9. The combination according to claim 8 wherein said plurality of gates are AND gates.

* * * * *